Figure 1:
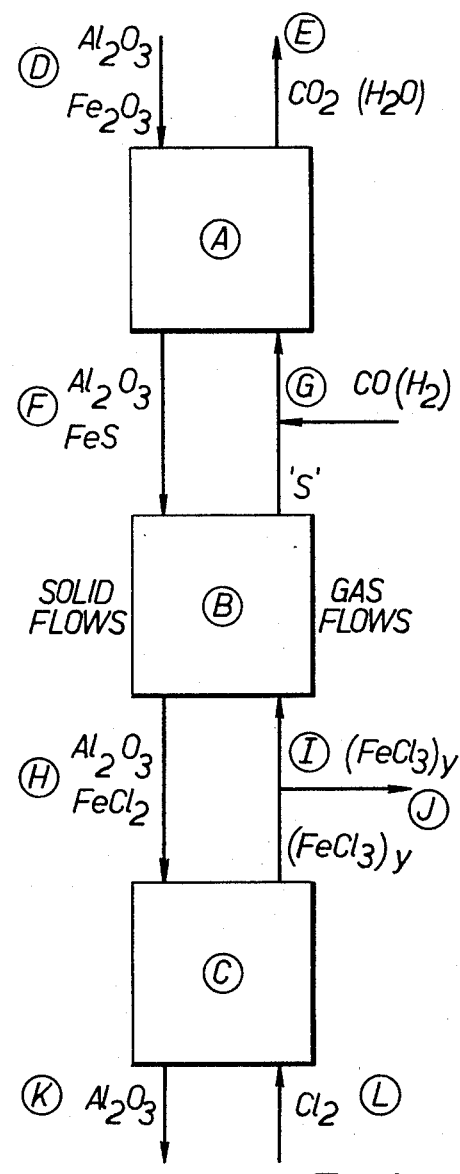

United States Patent [19]

Foley et al.

[11] 4,244,926
[45] Jan. 13, 1981

[54] MOVING BED CHLORINATION OF BAUXITE AND ILMENITE

[75] Inventors: Ernest Foley, East Burwood; Michael W. Wadsley, East Brighton, both of Australia

[73] Assignee: Commonwealth Scientific and Industrial Research Organization, Campbell, Austria

[21] Appl. No.: 49,024

[22] Filed: Jun. 15, 1979

[30] Foreign Application Priority Data

Jun. 15, 1978 [AU] Australia .................. PD4739/78

[51] Int. Cl.³ ............... C01G 23/02; C01G 23/04; C01F 7/02
[52] U.S. Cl. ....................... 423/77; 423/75; 423/76; 423/79; 423/133; 423/136; 423/135; 423/149; 75/1 R; 75/1 T
[58] Field of Search ............ 423/136, 149, 75–77, 423/79, 133, 135, 136; 75/1 R, 1 T

[56] References Cited

U.S. PATENT DOCUMENTS

| | | | |
|---|---|---|---|
| 1,824,807 | 9/1931 | English | 423/149 |
| 1,917,228 | 7/1933 | Bacon et al. | 423/149 |
| 1,917,229 | 7/1933 | Bacon et al. | 423/149 |
| 1,917,789 | 7/1933 | Bacon et al. | 423/149 |
| 2,238,103 | 5/1941 | Fink | 423/149 |
| 3,560,153 | 2/1971 | Hiester | 423/82 |

OTHER PUBLICATIONS

Holliday et al., "Industrial Eng. Chem., Process Des. Dev.", vol. 14, No. 4, 1975, pp. 447–452.

Primary Examiner—Herbert T. Carter
Attorney, Agent, or Firm—Sughrue, Rothwell, Mion, Zinn and Macpeak

[57] ABSTRACT

A process for the selective removal of iron from a ferruginous ore which comprises feeding the dried heated ore into a countercurrent reactor comprising a sulphidizing zone, an intermediate zone and a chlorination zone, through which zones the ore moves in sequence and wherein (a) in the sulphidizing zone, a reductant is introduced and the iron values present in the ore react selectively with sulphur and/or volatile sulphur-containing compounds in the presence of the reductant to form iron sulphides;

(b) in the intermediate zone, volatile ferric chloride formed in the chlorinating zone is introduced and reacts with the sulphidized ore to convert the iron sulphides into ferrous chloride and reform the sulphur and/or volatile sulphur containing compounds;

(c) in the chlorination zone, chlorine is introduced and converts the ferrous chloride formed in the intermediate zone into volatile ferric chloride;

(d) the volatile iron chlorides and the upgraded host oxide are separately removed from the chlorination zone; and (e) any volatile host chloride produced rises from the intermediate zone back to the sulphidizing zone where it meets the incoming ore, and is reconverted to host oxide.

6 Claims, 2 Drawing Figures

MOVING BED CHLORINATION OF BAUXITE AND ILMENITE

This invention is concerned with a process for the beneficiation of oxide ore by removal of iron values therefrom. The invention applies both to ores, such as bauxite, in which iron oxide is present essentially in physical admixture with the host oxide and to ores such as ilmenite, in which iron oxide is in chemical combination with the host oxide.

It is well known that most of the bauxite ores now being mined in large quantities contain too much iron oxide to permit their direct use in either the refractory and abrasive fields or in the economic production of aluminium chloride (an intermediate in aluminium metal manufacture by methods now being developed). Relevant methods of beneficiating bauxites which have been proposed are low temperature chlorinations in the presence of CO, carbon (U.S. Pat. No. 1,147,836) or sulphur chlorides (U.S. Pat. No. 1,858,272). Iron removal using aluminium chloride or gaseous HCl (British Pat. No. 306,094) have also been investigated. In most cases either iron removal was insufficiently complete or aluminium losses were too great. Chlorinating after reducing the iron to the metallic state (Foley & Tittle, Proc. A.I.M.M. 239, 59–61, 1971) produced an acceptable product with low aluminium losses but reduction required high temperatures (ca. 1000° C.).

Selective activation of iron by sulphidising followed by selective chlorination of the iron sulphide has been proposed (U.S. Pat. No. 2,238,103 and Australian Patent Application No. 79723/75). Both sulphidising and chlorination reactions are rapid at moderate temperature but unselective chlorination by sulphur chlorides formed in the reaction causes significant losses of aluminium.

Of the 'dry' methods of beneficiating bauxite ores, sulphidisation followed by chlorination of iron sulphide seems the most attractive, providing that losses of alumina can be maintained sufficiently low, and chlorine and sulphur values can be recycled efficiently and economically. It is an object of the present invention to provide a process which satisfies these criteria.

It is also well known that ilmenite ores contain too much iron to be suitable starting material for the chloride process for the production of titanium dioxide pigment (or titanium metal) not only because iron affects the purity but also because the iron consumes chlorine and presents an effluent disposal problem.

Processes which remove iron from ilmenite to produce a rutile substitute include (a) those in which iron oxide content of ilmenite is reduced essentially to the metallic state and is removed subsequently from the titania by chemical extraction or by physical separation; (Becher Australian Pat. No. 247,110).

(b) those in which most of the undesirable iron and other metal oxides are removed by leaching with mineral acid. Depending on the particular ilmenite used, a pretreatment such as partial oxidation and/or partial reduction or the iron content may be required to attain activated ferrous ion species prior to leaching; (e.g. Sinha & Waugh, Australian Pat. No. 416,143).

(c) those in which some or all of the metal contents are converted by chlorination to their respective volatile chlorides. These are then separated into individual compounds or groups of compounds for subsequent processing; (e.g., Fukushima & Imabayashi, German Offenlagungschrift No. 22 16 439.

(d) those in which most of the undesirable iron oxides are converted to iron sulphides which are removed subsequently from the titania by chemical extraction or by physical separation (e.g. Gaskin & Ringwood, Australian Pat. No. 222,517 and N. K. Hiester U.S. Pat. No. 3,560,153).

All the above processes have some disadvantages. For example, they may require high temperatures, multiple reactors or have large energy demands. Here again, the present invention seeks to provide a process by which these problems may be substantially overcome.

According to the present invention there is provided a process for the selective removal of iron from a feruginous ore which comprises feeding the dried heated ore into a countercurrent reactor comprising a sulphidizing zone, an intermediate zone and a chlorination zone, through which zones the ore moves in sequence and wherein (a) in the sulphidizing zone, a reductant is introduced and the iron values present in the ore react selectively with sulphur and/or volatile sulphur-containing compounds in the presence of the reductant to form iron sulphides;

(b) in the intermediate zone, volatile ferric chloride formed in the chlorinating zone is introduced and reacts with the sulphidized ore to convert the iron sulphides into ferrous chloride and reform the sulphur and/or volatile sulphur containing compounds;

(c) in the chlorination zone, chlorine is introduced and converts the ferrous chloride formed in the intermediate zone into volatile ferric chloride;

(d) the volatile iron chlorides and the upgraded host oxide are separately removed from the chlorination zone; and (e) any volatile host chloride produced rises from the intermediate zone back to the sulphidizing zone where it meets the incoming ore, and is reconverted to host oxide.

The term "host chloride" as used herein means the chloride of the metal whose oxide is the main constituent of the ore being treated, i.e., the oxide which is beneficiated by the process.

By a "countercurrent reactor" we mean any reactor in which there is relative flow, in opposing directions, of the solid and gaseous materials. A moving bed reactor is preferred but not essential.

Thus, in the process of the present invention, the entire reaction sequence may take place in a single reactor.

The invention will be further described and illustrated by reference to the accompanying drawings which for convenience of description will refer to the treatment of bauxite.

It will be understood, of course, that the same general considerations apply in the treatment of ilmenite and other ferruginous materials.

Figure 2:
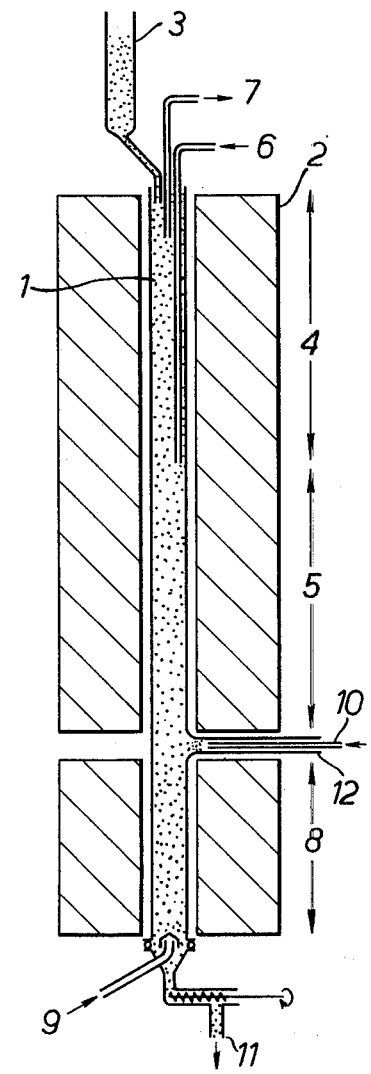

In the drawings:

FIG. 1 is a flow chart of the process of the invention, as applied to bauxite treatment; and FIG. 2 is a diagrammatic representation of a small-scale, shaft-type, moving bed reactor for carrying out the process.

In FIG. 1, the flows of solid materials through the process are shown by the arrows on the left and gas flows are represented by the arrows on the right. The three states of the process, i.e., the reactor zones, are sulphidation (A), intermediate (B) and chlorination (C).

In the sulphidation stage, dried bauxite (containing alumina and iron oxides) is fed (D) into the sulphidation zone (A) where it meets an upward flow of the reductant (which may be selected from carbon monoxide, hydrogen, hydrocarbons and mixtures of any two or more thereof) which is injected at (G) and the volatile sulphur-containing substance "S" from the intermediate zone (B). The reductant is oxidized (e.g., to $CO_2$ and/or $H_2O$) and exits from the zone (A) at (E). The iron values converted to sulphides according to reactions 1(a) and/or 1(b).

(Note: All of the reactions involved in the process are complex but, for convenience only, are set out in simplified form in this discussion.)

$$Fe_2O_3 + 3CO + 2y\text{"S"} \rightarrow 2FeS_y + 3CO_2 \tag{1a}$$

or $$Fe_2O_3 + 3H_2 + 2y\text{"S"} \rightarrow 2FeS_y + 3H_2O \tag{1b}$$

where "S" is a volatile sulphur-containing substance e.g. $S_n$ (n=1–8), $SO_2$, $SCl_x$ (x=1, 2, 4).

The solid products (F) (alumina and iron sulphides) move down to the intermediate zone (B) where they meet an upward flow (I) of ferric chloride vapour (which may also contain some chlorine) from the chlorination zone (C).

The following reactions occur:

$$FeS_y + 2\text{"Cl"} = FeCl_2 + y\text{"S"} \tag{2}$$

where "S" is as defined above and "Cl" is a volatile chlorinating substance, e.g., $Fe_2Cl_6$, $FeCl_3$, $Cl_2$.

The solids (alumina and ferrous chloride) pass down to the chlorination zone (C) where they meet an upward flow (L) of chlorine and the following reaction occurs:

$$FeCl_2 + Cl_2 = (FeCl_3)_n \tag{3}$$

where n=1 or 2

Any aluminium chloride which may form in the intermediate and/or chlorination zone is reconverted to aluminium oxide in the sulphidation zone by reaction (4a) and/or (4b).

$$8AlCl_3 + 6Fe_2O_3 + 3S = 4Al_2O_3 + 12FeCl_2 + 3SO_2 \tag{4a}$$

and/or $$8AlCl_3 + 6Fe_2O_3 + 6CO = 4Al_2O_3 + 12FeCl_2 + 6CO_2 \tag{4b}$$

The upgraded alumina emerges (K) from the bottom of zone (C). By-product ferric chloride is vented from the upper section of the chlorination zone (C) at (J).

It will be seen that in such a system sulphur moves down the reactor in the form of iron sulphides and and rises in the form of $S_n$, $SO_2$, $S_2Cl_2$, etc. Hence, apart from small additions to compensate for process losses, sulphur compounds need not be added once the system has become stabilized. Furthermore, the height of the incoming unreacted bauxite column may be chosen to be sufficient to ensure that any $AlCl_3$ formed in the interior of the reactor will react with the $Fe_2O_3$ present in the incoming bauxite, e.g., according to equation (4a and/or b).

The upward movement of ferric chloride is also restricted because of its conversion to involatile ferrous chloride in the intermediate zone, i.e., rising ferric chloride is converted to downward moving involatile ferrous chloride. When the ferrous chloride descends into the chlorination zone volatile ferric chloride is re-formed. Hence, iron chlorides cannot rise beyond the intermediate zone, and therefore are not found in significant amounts in the exit gases from the top of the reactor. Instead the iron emerges, essentially as ferric chloride relatively free from CO, $CO_2$, etc. at a point below the junction of the intermediate and chlorination zones.

In the practical operation of the process the proportion of sulphur species in the system is one of the factors determining the maximum throughput of the reactor. To inhibit formation of $FeCl_2$ by dissociation of $FeCl_3$ in the outlet gas a slight excess of chlorine is added. This is withdrawn with the $FeCl_3$ off-gas. Reductant is fed into the bed at a rate commensurate with the feed rate of the mineral. The height of unreacted ore in the upper section of the reactor is chosen so as to be sufficient to ensure complete recovery of sulphur compounds.

Those skilled in the art will appreciate that the above-described process can be applied to the beneficiation of ferruginous ores such as ilmenite as well as bauxite. While the specific process parameters may require some change, the overall principles remain the same.

One practical form of apparatus, namely a moving bed reactor is illustrated in FIG. 2 of the accompanying drawings. This is a laboratory-scale moving-bed reactor which comprises a tubular reaction chamber 1, made of fused silica or other suitable refractory material, positioned within a sectioned, electrically heated furnace 2. A storage hopper 3 holds dried ore for feeding into the upper section of the reactor which comprises the sulphidizing zone 4 and intermediate zone 5. A gas inlet pipe 6 opens into, at or near the bottom of the sulphidizing zone 4 for introduction of the reductant—in this case carbon monoxide. Gas outlet pipe 7 collects exit gases from the furnace for analysis and/or disposal.

The lower section 8 of the reactor comprises the chlorination zone and a chlorine gas inlet pipe 9 enters the reactor near the bottom of section 8. A scroll unit 11 connects with the base of the reactor for withdrawal of the beneficiated ore.

At or near the top of the chlorination zone 8, a side-arm 12 is joined to the tube 1 for withdrawal of volatile products, mainly ferric chloride. The side-arm 12 is provided with a heater (not shown) to prevent condensation of iron chlorides and a chlorine inlet 10 to prevent disproportiation of ferric chloride to ferrous chloride and chlorine. Normally the $FeCl_3$ and excess chlorine pass along the heated side-arm 12 to an oxidation unit (not shown) where $FeCl_3$ is oxidized to $Fe_2O_3$ and $Cl_2$ by known methods, the oxide then being physically separated from the regenerated chlorine which is then recycled to the base of the reactor through pipe 9.

For investigational purposes, the $FeCl_3$ and any trace of $AlCl_3$ present in the off-gases may be scrubbed from the chlorine in the reactor off-gases by a suitable salt packed column (not shown). Low-melting salts are thus formed and may be collected and analysed for $FeCl_3$ and $AlCl_3$ both during and after trial operation.

In operation, the dried ore is fed from hopper 3 into the top of the sulphidizing zone 4. The reductant (CO)

is fed into the sulphidizing zone 4 through pipe 6, and chlorine is fed into the base of zone 8 through pipe 9.

During start-up of the reactor, the sulphur required is supplied by introduction of $SO_2$ with the reductant or by introduction of pre-sulphidized bauxite ore, or both. Other less convenient sources of sulphur, e.g., elemental sulphur, hydrogen sulphide, carbonyl sulphide, carbon disulphide or iron sulphide may of course also be used.

During normal running ore entering the sulphidizing zone 4 meets with the rising vapours of sulphur and/or valatile sulphur compounds and the reductant and the iron oxides present in the ore react with the gases to form iron sulphides (see reaction 1(a) above.)

On entering the intermediate zone 5, the iron sulphides meet the rising chloride containing gas and react to form ferrous chloride and reform the sulphur and/or volatile sulphur compounds.

Any aluminium chloride which may be formed in the intermediate or chlorination zones continues up through the bed, where it meets with the incoming ore and reacts with the iron oxide therein to form ferrous chloride and reform aluminum oxide. Any ferrous chloride so formed passes down the column with the ore.

The rate of ferrous chloride production at a given time is related to the rate of sulphur production in the intermediate zone. Variations of this rate will be reflected by variation in the CO content of the $CO_2$-rich off-gases and of the quantity of ferric chloride and free chlorine in the $FeCl_3$-rich off-gases. Consequently, metering the concentration of these components enables the reactor to be controlled. Due to the inertia within the system there is, a short but observable time lag between changing the chlorine rate and noting its effect on the $CO$-$CO_2$ ratio in the off-gases from the top of the reactor.

The operating temperature and length of the sulphidising zone are interdependent, and are selected so as to ensure that reaction is complete within the available length of the zone, subject to the sulphidising agents being maintained in the gaseous state.

The upper temperature limit of the intermediate zone is determined by the need to limit the vapour pressure of the ferrous iron compounds to ensure their net movement down the reactor. The minimum temperature is set by the need to maintain both the chlorinating reagents and the sulphurous products in the gaseous state.

The operating temperature range of the chlorination zone is determined by the need to maintain the net downward flow of ferrous compounds and to maintain the ferric chloride produced in the zone in the gaseous state.

In general, at temperatures above 800° C., the vapour pressure of the ferrous iron compounds is too high to permit successful operation. The preferred temperature ranges are:

| Sulphidizing zone | 550°–800° C. |
|---|---|
| Intermediate zone | 500°–750° C. |
| Chlorination zone | 350°–750° C. |

In the apparatus we have used, satisfactory results have been obtained with all zones operating at about 700° C.

The cooled upgrade product (e.g. bauxite) may contain small amounts of chlorine, metal chlorides, hydrogen chloride and water. If desired these can be removed by standard methods e.g., water washing and/or calcination.

The following non-limiting examples further illustrate the principles and operation of the process of this invention:

EXAMPLE 1

Bauxite from the Andoom (Nth Queensland) deposit of the following composition:

TABLE 1

| $Al_2O_3$ | — | 54.9 wt % |
|---|---|---|
| $Fe_2O_3$ | — | 13.0 wt % |
| $SiO_2$ | — | 5.2 wt % |
| $TiO_2$ | — | 2.9 wt % |
| L.O.I. | — | ca 24.0 % | was crushed to minus 10 mesh B.S.S. and after screening out the minus 22 mesh B.S.S. fraction was calcined for 1 hour in an electrically heated rotary kiln furnace at 600° C. for 1 hour. The calcined bauxite was then fed into the storage hopper (3) atop the reactor.

The reactor was heated to 700° C. and filled with calcined bauxite and the product scroll (11) was adjusted commensurate with a feed rate of 10 g min.$^{-1}$ of calcined bauxite. $SO_2$ and CO were then passed into the upper section of the reactor at 0.6 l m$^{-1}$ and 2.1 l m$^{-1}$ respectively (from temperature) for 30 minutes. At this stage of sulphidizing the initial charge of ore, only $CO_2$ was detected in the exit gas, indicating complete sulphidization. After 30 minutes the flow of $SO_2$ was stopped and the CO rate adjusted to 0.96 l m$^{-1}$ corresponding to a 20% excess of CO. Gaseous chlorine was injected into the base of the reactor at 1.2 l m$^{31}$$^1$, a 50% excess over stoichiometric requirements, to promote complete chlorination or iron. When the reactor had attained a steady state the chlorine rate was adjusted until the CO content of the $CO$-$CO_2$ off-gas stream reached 16.7%, i.e. corresponding to the 20% excess CO.

After 6 hours the operation was concluded. The $NaCl$-$FeCl_3$-$AlCl_3$ melt was then analysed and found to contain $FeCl_3$ and $AlCl_3$ in the molecular ratio of 13.8:1 (corresponding to an aluminium loss of 0.4%) compared with a corresponding ratio of 0.14:1 in the raw material. At the same time, 88.1% of the iron had been removed from the calcined bauxite. The composition of the steady-state product is as follows:

TABLE 2

| $Al_2O_3$ | — | 81.8 wt % |
|---|---|---|
| $Fe_2O_3$ | — | 2.3 wt % |
| $TiO_2$ | — | 3.9 wt % |
| $SiO_2$ | — | ca 8.0 wt % |
| L.O.I. | — | 3.9 wt % |
| $Al_2O_3/Fe_2O_3$ ratio | — | 4.1 initial |
| $Al_2O_3/Fe_2O_3$ ratio | — | 35.6 final |

X-ray examination of the solid product showed that more than 90% of the alumina was present as the reactive $\gamma$ form.

Analysis at the end of the trial showed that the sulphur-containing species were confined to a 33 cm section of the reactor. This section contained 23 g sulphur (equivalent) in 340 g of material. Comparing this with the 23.6 g sulphur (equivalent) injected into the system at the start of the trial indicates that very little sulphur escaped from the reactor during the run.

EXAMPLE 2

Bauxite from the Weipa district of Nth Queensland of the following composition:

TABLE 3

| | | |
|---|---|---|
| $Al_2O_3$ | — | 59.8 wt % |
| $Fe_2O_3$ | — | 7.4 wt % |
| $SiO_2$ | — | 5.4 wt % |
| $TiO_2$ | — | 2.4 wt % |
| L.O.I. | — | 26.0 wt % | was heated to 700° C. in the reactor used in Example 1. Because of the lower iron content of Weipa bauxite, compared with that from Andoom, Weipa bauxite was fed in at 20 g min$^{-1}$. Gas flows were similar to those of Example 1. The composition of the product was as in Table 4.

TABLE 4

| | | |
|---|---|---|
| $Al_2O_3$ | — | 84.3 wt % |
| $Fe_2O_3$ | — | 1.5 wt % |
| $SiO_2$ | — | 7.4 wt % |
| $TiO_2$ | — | 3.1 wt % |
| L.O.I. | — | 3.5 wt % |

EXAMPLE 3

Ilmenite from West Australia, having the composition given in Table 5, was sulphided and then chlorinated in a vertical shaft reactor of similar diameter and length to the individual reactor zones described in Example 1.

TABLE 5

| | | |
|---|---|---|
| $Fe_{Total}$ | — | 32.6 wt % |
| $TiO_2$ | — | 55.6 wt % |
| Remainder | — | MnO, MgO, $SiO_2$, $Al_2O_3$ etc. |

The tests were carried out batchwise, the ilmenite not being removed from the reactor. Continuous tests were not performed purely as a matter of experimental convenience, the continuous reactor described above not being designed to cope with the physical characteristics of the ilmenite, e.g., small particle size compared with bauxite. Those skilled in the art will appreciate that consecutive batchwise sulphidation and chlorination closely approximates the operation of the continuous reactor.

The beneficiated product had the composition given in Table 6.

TABLE 6

| | | |
|---|---|---|
| $Fe_{Total}$ | — | 0.74 wt % |
| $TiO_2$ | — | 90.1 wt % |
| Remainder | — | MnO, MgO, $SiO_2$, $Al_2O_3$ etc. plus Mn, Mg chlorides |

EXAMPLE 4

The beneficiated bauxite produced in Example 1 on calcination at 1200° C. for 1 hour, gave a product of the composition shown in Table 7.

TABLE 7

| | | |
|---|---|---|
| $Al_2O_3$ | — | 85.2 wt % |
| $Fe_2O_3$ | — | 2.4 wt % |
| $TiO_2$ | — | 4.1 wt % |
| $SiO_2$ | — | 8.3 wt % |

EXAMPLE 5

The beneficiated bauxite produced in Example 2 on washing with boiling water, followed by calcination at 1200° C., gave a product having the composition shown in Table 8.

TABLE 8

| | | |
|---|---|---|
| $Al_2O_3$ | — | 87.4 wt % |
| $Fe_2O_3$ | — | 1.6 wt % |
| $SiO_2$ | — | 7.7 wt % |
| $TiO_2$ | — | 3.2 wt % |

EXAMPLE 6

In the case of those ilmenites where significant proportions of manganese or magnesium are present, leaching with water after benefication removes the manganese and magnesium chlorides, formed during chlorination, effecting a significant improvement in the $TiO_2$ content of the final product. Thus the beneficiated product from Example 3 on water leaching, gave a calcined product of composition given in Table 9.

TABLE 9

| | | |
|---|---|---|
| $Fe_{Total}$ | — | 0.85 wt % |
| $TiO_2$ | — | 95.4 wt % |
| Remainder | — | MnO, MgO, $SiO_2$, $Al_2O_3$ etc. |

It will be seen that the invention provides a useful method whereby iron values are selectively removed from bauxite and ilmenite by preferential sulphidisation and chlorination. The method has the following specific advantages:

(a) there are insignificant losses of aluminium in the case of bauxite and of titanium in the case of ilmenite.

(b) because the series of sequential reactions occurs in specific zones of a single reactor one need only meter the reactants injected into the reactor.

(c) substantially all the participating sulphur compounds are retained in the reactor.

(d) ferric chloride may be obtained from an oxide system undiluted by gases other than chlorine.

(e) hydrogen may be used as a reductant with negligable formation of hydrogen chloride.

(f) moisture present in the ore does not result in production of significant proportions of hydrogen chloride.

We claim:

1. A process for the selective removal of iron from a ferruginous ore selected from the group consisting of bauxite and ilmenite, which comprises feeding the dried heated ore into a countercurrent reactor comprising a sulphidizing zone, an intermediate zone and a chlorination zone, through which zones the ore moves in sequence and (a) in the sulphidizing zone, introducing a reductant so that the iron values present in the ore react selectively with sulphur and/or volatile sulphur-containing compounds in the presence of the reductant to form iron sulphides;

(b) in the intermediate zone, introducing volatile ferric chloride formed in the chlorinating zone, which reacts with the sulphidized ore to convert the iron sulphides into ferrous chloride and reform the sulphur and/or volatile sulphur containing compounds;

(c) in the chlorination zone, introducing chlorine which converts the ferrous chloride formed in the intermediate zone into volatile ferric chloride;

(d) separately removing the volatile iron chlodides and the upgraded host oxide from the chlorination zone; and (e) allowing any volatile host chloride produced to rise from the intermediate zone back to the sulphidizing zone where the chloride meets the incoming ore, and is reconverted to host oxide, and wherein the temperature of the sulphidizing zone is in the range 550° C. to 800° C.; the temperature of the intermediate zone is in the range 500° to 750° C.; and the temperature of the chlorination zone is in the range of 350° to 750° C.

2. A process as claimed in claim 1, wherein the reactor is a moving bed reactor.

3. A process as claimed in claim 1, wherein the ferruginous ore is bauxite.

4. A process as claimed in claim 1, wherein the ferruginous ore is ilmenite.

5. A process as claimed in claim 1, wherein the process includes introducing the sulphur-containing substance into the reactor in the form of elemental sulphur, sulphur dioxide, hydrogen sulphide, carbonyl sulphide, carbon disulphide, iron sulphide or presulphidized ore.

6. A process as claimed in claim 1, wherein the temperature of all three of said zones is about 700° C.

* * * * *